United States Patent

[11] 3,598,222

| [72] | Inventor | Samuel A. Mencacci<br>Wilrijk, Antwerp, Belgium |
|---|---|---|
| [21] | Appl. No. | 813,814 |
| [22] | Filed | Apr. 3, 1969 |
| [45] | Patented | Aug. 10, 1971 |
| [73] | Assignee | International Machinery Corporation S. A.<br>St. Niklass-Waas, Belgium |

[54] HIGH-SPEED FEED MECHANISM
23 Claims, 9 Drawing Figs.

[52] U.S. Cl. .................................................... 198/30,
 198/33 AC
[51] Int. Cl. .................................................... B65g 47/24
[50] Field of Search .......................................... 198/34, 33,
 30, 362

[56] References Cited
UNITED STATES PATENTS
2,781,123  2/1957  Gueffroy .................... 198/34
3,311,216  3/1967  Jones ......................... 198/30
3,340,791  9/1967  Mencacci ................... 99/362

Primary Examiner—Richard E Aegerter
Attorneys—F. W. Anderson and C. E. Tripp

ABSTRACT: A high-speed feed mechanism for feeding rows of containers into elongated carriers of a processing conveyor. The mechanism moving containers that are supported on their ends and are divided into independent lanes between timing belts driven at or slightly less than the desired feed rate. The containers in each lane being separated and twisted into horizontal position for combining with other containers from other lanes in a transfer conveying means to form full or partial rows of containers moving at the same speed as the carriers of the processing conveyor. Independently controlled arresting means are provided for each lane of containers to momentarily terminate movement of the containers in a portion of the lane in the event the supply of containers in that lane is not as desired.

FIG_1
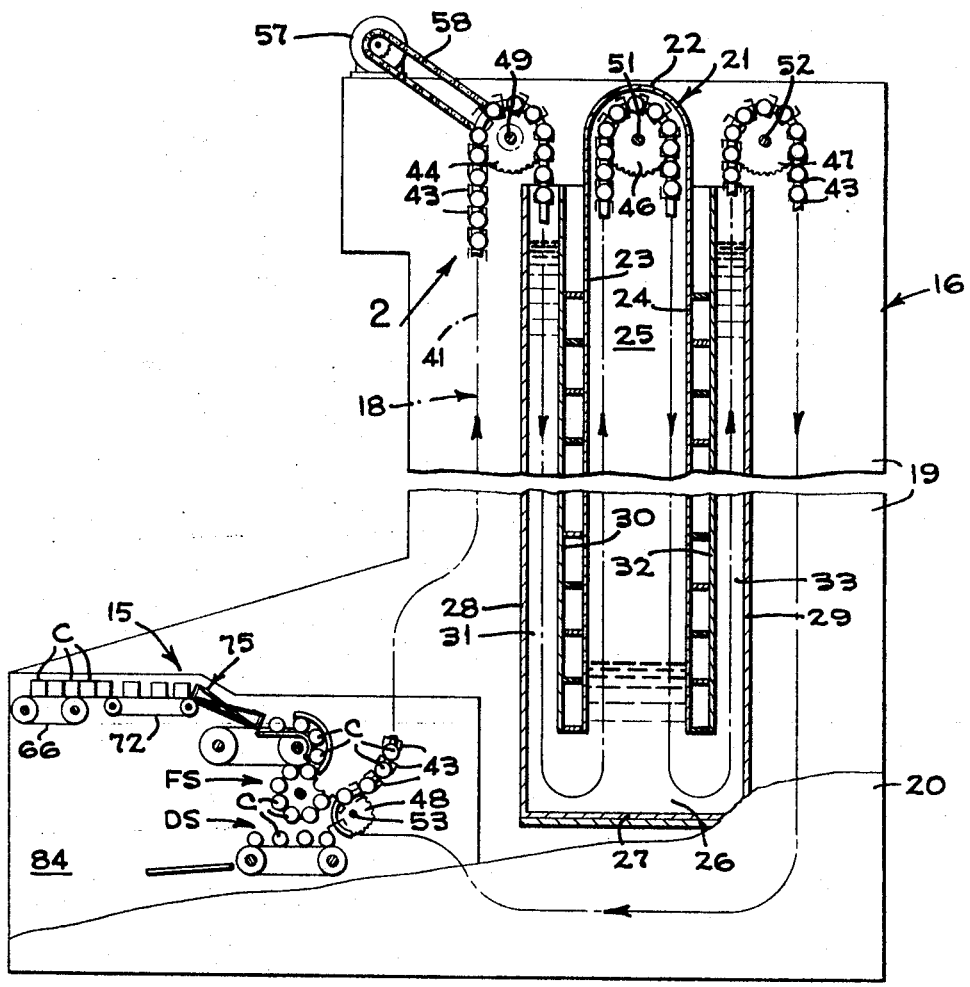
FIG_2
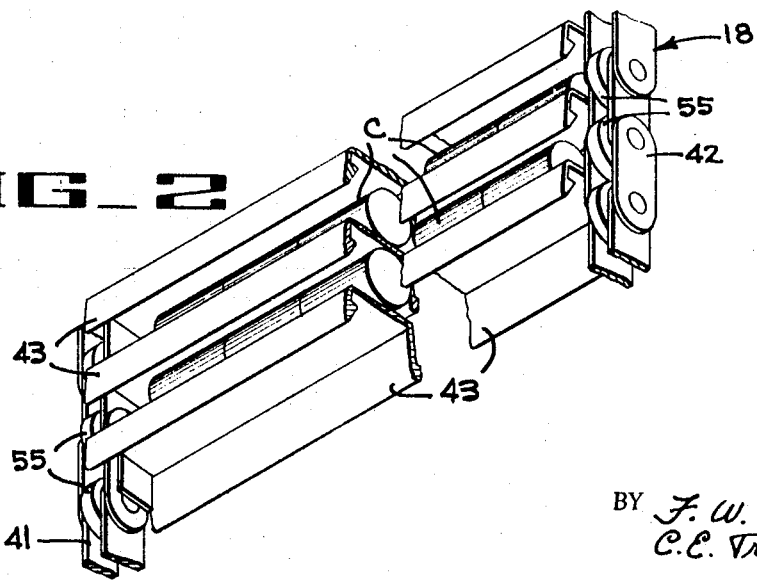
INVENTOR.
SAMUEL A. MENCACCI
BY F. W. Anderson
C. E. Tripp
ATTORNEYS

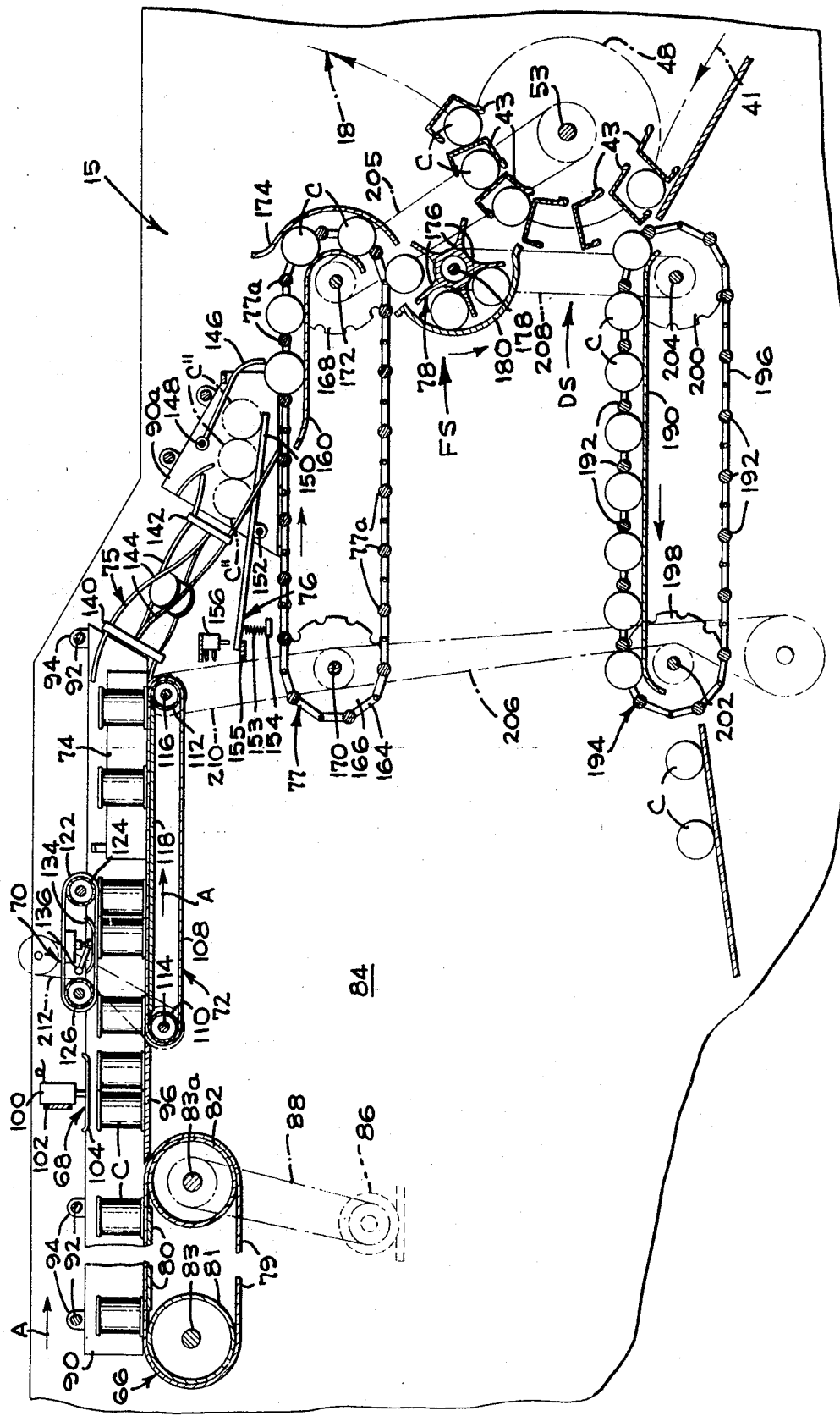
FIG_3

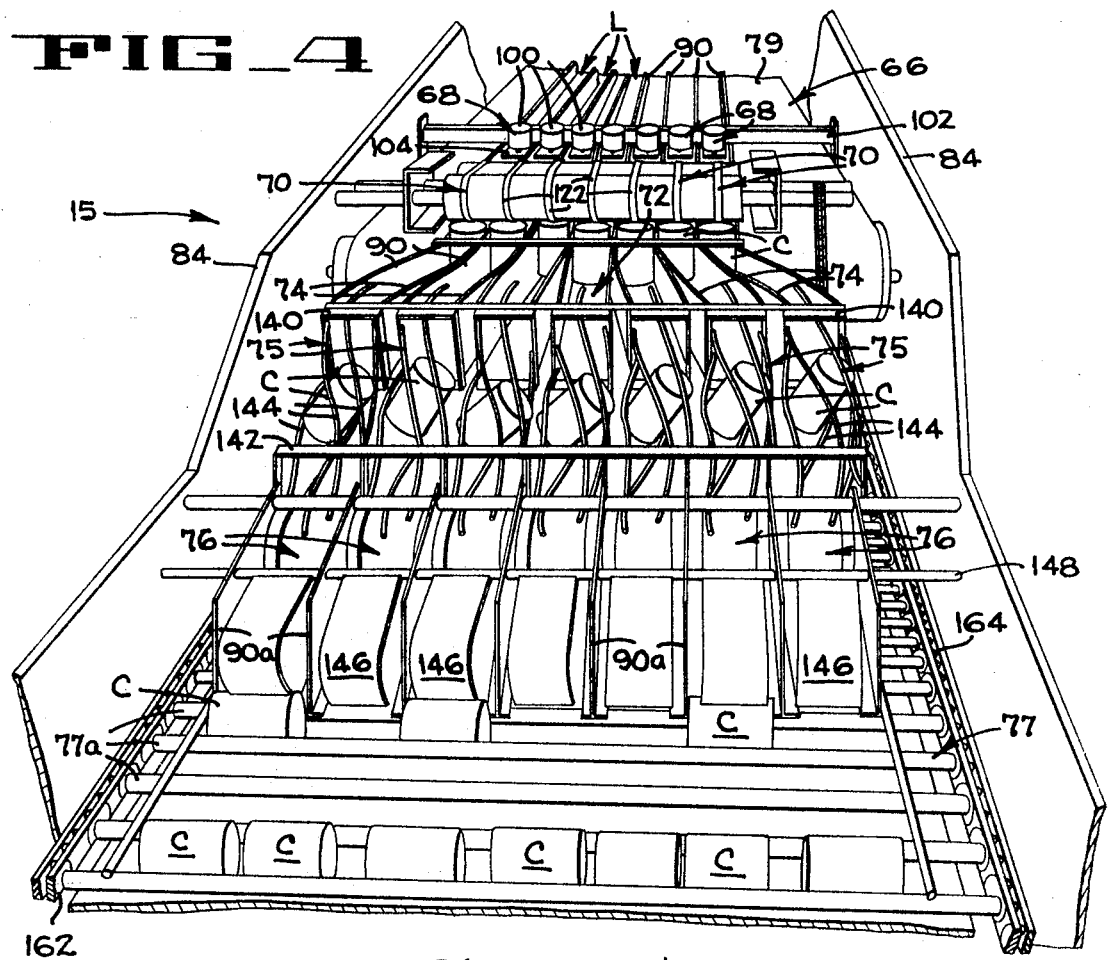
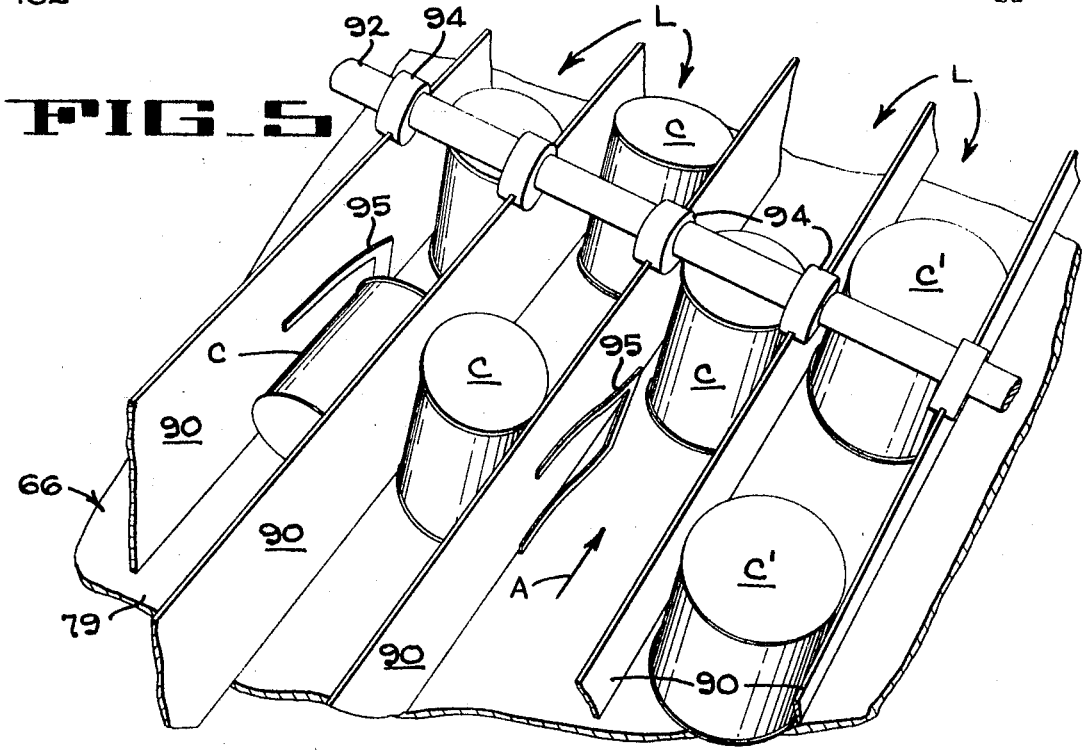

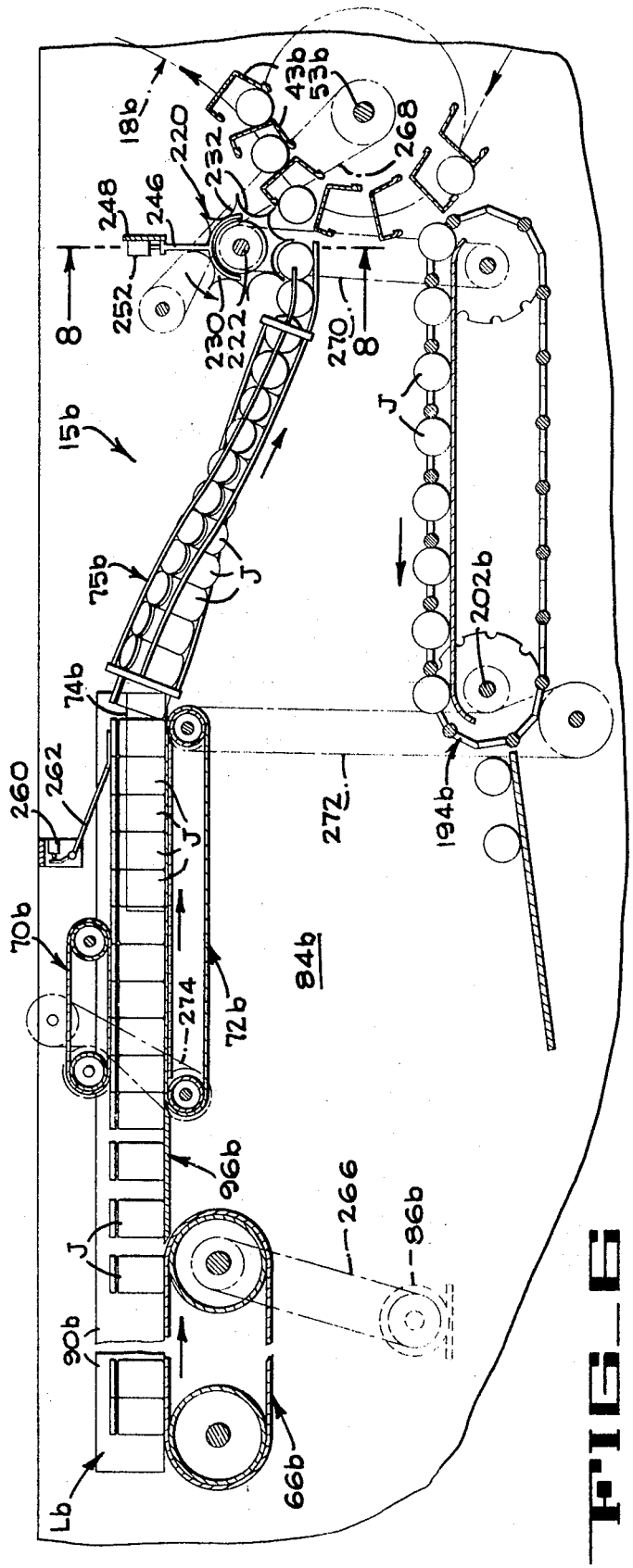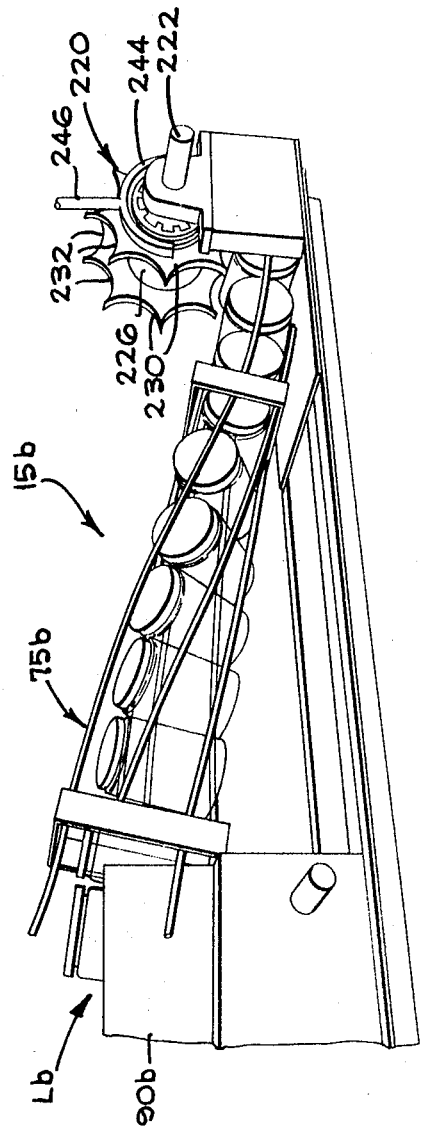

3,598,222

1

HIGH-SPEED FEED MECHANISM

BACKGROUND OF THE INVENTION

1. Field of the Invention

This invention pertains to the cooker art and more particularly relates to a high-speed feed mechanism for forming containers into rows and feeding the containers into elongated carriers of a continuously driven processing conveyor.

2. Description of Prior Art

Cookers such as hydrostatic cookers are well known in the art and include one or more continuously driven endless conveyors having elongated carriers thereon adapted to receive rows of containers that are about 7 feet long. The usual feed system for such cookers includes a continuously driven endless feed conveyor disposed parallel to the carriers at a feed station and means for forming and then deflecting each row of containers transversely into the carriers as they move therepast. Because each row of containers must be formed at the feed station and only after the preceding row has been deflected into the associated carrier, the time required for such formation with this prior art type of feed mechanism limits the rate of movement of the processing conveyor to about 20 rows per minute per feed station.

A feed mechanism which forms the containers into rows prior to reaching a feed position immediately adjacent the carriers is disclosed in U.S. Pat. No. 3,340,791 which issued to Mencacci et al. and is assigned to the assignee of the present invention. This feed mechanism, however, was arranged to feed only complete rows and would interrupt the entire operation if a single container was not present in a row being formed. Furthermore, this feed mechanism was intermittently operated and accordingly was not intended to operate at high speeds.

SUMMARY OF THE INVENTION.

The high-speed feed mechanism of the present invention is capable of operating at a rate of about 60 to 80 rows per minute, is arranged to receive containers supported on their ends, to divide the containers into separate lanes, and to then advance the containers between timing belts which move the containers at the same speed or slightly slower than the speed of the processing conveyor. The containers in each lane are then passed through twisters to shift the axis of each container from a vertical to a horizontal position, one twister being provided for each lane. The containers are then received by row accommodating conveying means that is driven at the same speed as the processing conveyor and which transfers the rows of containers directly into the carriers.

If metal containers such as cans are being processed in accordance with a first embodiment of the invention, it has been determined that the cans tend to jam if they are contacting each other when moving through their associated twister. Accordingly, when handling cans independently controlled arresting means are provided for each lane to detect the presence of an excessive amount of containers in any lane, and upon such detection, to cause the arresting means to terminate movement of the containers upstream thereof until such time as the overload is corrected.

If glass containers are being processed in accordance with a second embodiment of the invention, it has been discovered that in order to minimize glass breakage it is desirable to maintain the containers in each lane in abutting engagement and under a slight pressure as they move through the twister and into the row accommodating conveying means. Accordingly, independently controlled arresting means are provided for each lane to detect the absence of containers between the timing belts and the row accommodating means. Upon detection of the absence of a contacting series of containers in one of the lanes, the arresting means associated with that lane will cause the portion of the row-accommodating conveying means associated with that lane to preclude further movement of the containers in that lane until a full row is again present in the twister of that lane.

2

BRIEF DESCRIPTION OF THE DRAWINGS

FIG. 1 is a diagrammatic elevation with parts broken away and other shown in section of a hydrostatic cooker which employs the improved high-speed feed system of the present invention.

FIG. 2 is an enlarged perspective of the processing conveyor taken looking in the direction of arrow 2 of FIG. 1 showing several carriers with their central portions broken away.

FIG. 3 is an enlarged diagrammatic vertical section of the high-speed feed mechanism of the present invention and of a discharge mechanism, both mechanisms being shown at feed and discharge station of the cooker, certain portions of the feed mechanism being foreshortened.

FIG. 4 is a perspective of a seven-lane feed mechanism taken looking in a direction opposite to the direction of movement of the containers illustrating two partial rows of containers, several rows of containers being omitted in order to better illustrate a row forming conveyor.

FIG. 5 is a perspective of a fragment of a lane-forming feed conveyor illustrating means for terminating movement of improperly positioned containers and showing a lane adapted to handle different sizes of containers.

FIG. 6 is a diagrammatic vertical section similar to FIG. 3 of a modified form of the invention adapted to handle glass jars.

FIG. 7 is a perspective of a fragment of the apparatus shown in FIG. 6.

DESCRIPTION OF THE PREFERRED EMBODIMENT

Figure 8:
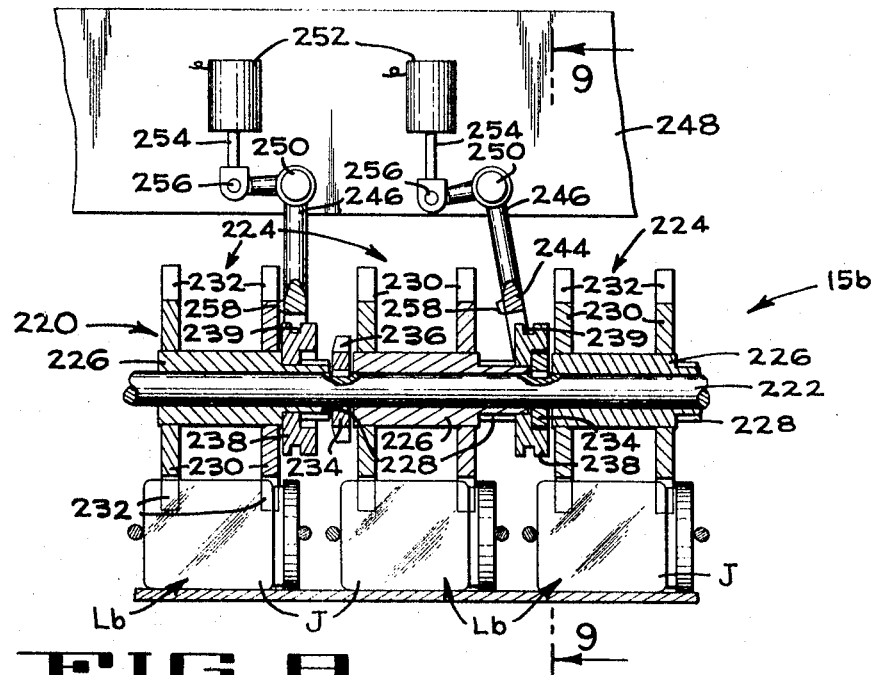
FIG. 8 is a vertical section taken along line 8–8 of FIG. 6 illustrating portions of the independent control means associated with two of the lanes.
Figure 9:
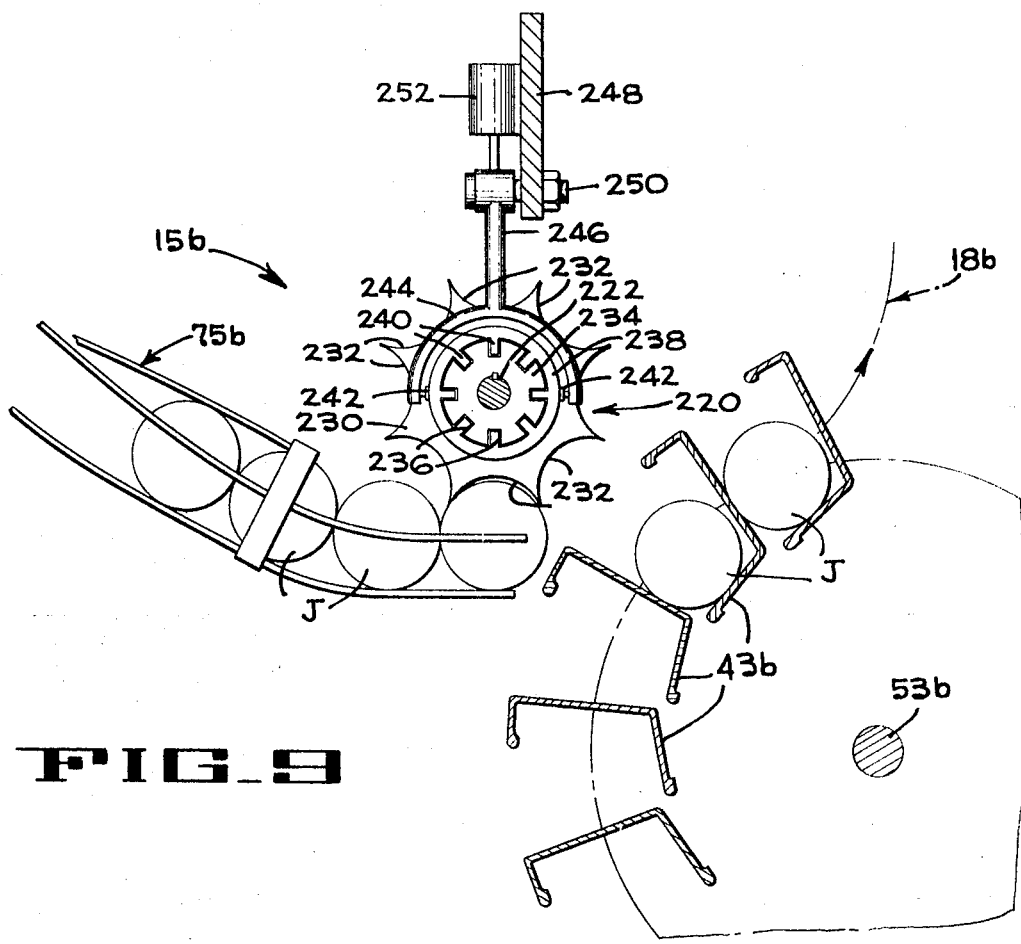
FIG. 9 is a vertical section taken along lines 9–9 of FIG. 8.

The high-speed feed and discharge mechanism 15 (FIGS. 1 and 3) of the present invention is associated with a hydrostatic cooker 16 (FIG. 1) having a processing conveyor 18 therein. The hydrostatic cooker 16 comprises a pair of spaced vertical support walls 19 and 20 suitably supported in upright position. A housing 21, which extends between the walls 19 and 20, has a rounded upper end 22 and two depending walls 23 and 24 which cooperate with the walls 19 and 20 to define a cooking chamber 25 which is filled with a heat treatment medium such as steam at a predetermined cooking pressure and temperature, for example, at 270° F. and 15 p.s.i. gauge. The lower end of the housing 21 opens into a water filled trough 26 which is formed by walls 19 and 20, a transverse horizontal plate 27, and the lower end portions of two transverse vertical walls 28 and 29. The wall 28 cooperates with another transverse vertical wall 30 to define an inlet hydrostatic water leg 31, and wall 29 cooperates with a transverse vertical wall 32 to provide an outlet hydrostatic water leg 33. The hydrostatic legs 31 and 33 communicate with trough 26 and are filled with water so as to create sufficient pressure to resist the pressure of steam in the cooking chamber 25. The inlet hydrostatic water leg 31 is thermostatically controlled to provide a gradually increasing water temperature from approximately 210° F. at its upper end to approximately 245° F. at its lower end. The outlet water leg 33 is also thermostatically controlled to provide a gradual decrease of water temperature from approximately 245° F. at its lower end to any suitable temperature below the boiling point of water at atmospheric pressure, depending upon the type of containers being handled, at the upper end thereof. Steam is added to the water in the hydrostatic inlet leg 31 to provide the desired heating temperatures therein, and cold water is directed into the outlet or cooling leg 33 to provide the desired cooling temperature therein.

Rows of containers C to be processed are carried through the cooker by the processing conveyor 18. The conveyor 18 comprises a pair of endless chains 41 and 42 (FIG. 2) having a plurality of elongated spaced carrier bars 43 mounted therebetween. The chains 41 and 42 are trained around transversely aligned pairs of sprockets 44, 46, 47 and 48 (FIG. 1) which are keyed to shafts 49, 51, 52 and 53, respectively, that are suitably journaled on the sidewalls 19 and 20. The chains 41 and 42 are guided along tortuous paths by channel tracks (not shown) which are secured to the frame of the cooker and are arranged to receive rollers 55 carried by the chains. A motor 57 is connected to the shaft 49 by a chain drive 58 and drives the conveyor 18 in the direction of the arrows on the pitch line as shown in FIG. 1.

The carriers 43 of the conveyor 18 (FIGS. 2 and 3) may be of any suitable articulating type and, as shown in FIG. 3, are C-shaped carriers which are arranged to confine the containers therein as the processing conveyor 18 moves the containers through the heat treatment chambers within the cooker, and are arranged to open to receive containers or release containers as the carriers move around a sharp curve at the feed station FS and discharge station DS.

In general, the first embodiment of the high-speed feed mechanism 15 (FIGS. 3 and 4) of the present invention is designed for use with metal containers and comprises a wide feed conveyor 66 divided into a number of lanes L (FIGS. 4 and 5), and which moves each lane of containers past an arresting mechanism 68 and between one of a plurality of narrow upper timing conveyors 70 and a wide lower timing conveyor 72 which moves the containers at the same speed as or slightly slower than the processing conveyor 18. The lower timing conveyor 72 then moves the lanes of containers through a plurality of diverging guide plates 74 (FIG. 4) which define a spacing section for spacing the containers transversely of their direction of movement. The plates 74 assist in directing each lane of containers through one of a plurality of twisters 75, which twisters shift the containers from a position wherein their axes are vertical to a position wherein their axes are horizontal. The containers in the lanes L are moved across independent control devices 76 (FIG. 3) of the arresting means and are discharged onto transfer conveying means which includes a row-forming conveyor 77 and a pocketed turret 78. The containers are first received in rows between the crossbars of the row forming conveyor 77. The row forming conveyor 77 transfers the rows to the turret 78 which in turn transfers each row or partial row of containers into one of the carriers 43 of the processing conveyor 18.

More particularly, the feed conveyor 66 comprises a wide draper chain 79 having its upper run guided along a plate 80 (FIG. 3). The draper chain 79 is trained over a driven roller 81 and a drive roller 82 which rollers are mounted on shafts 83 and 83a, respectively, journaled in a subframe 84. The feed conveyor 66 is driven in the direction indicated by the arrows A (FIG. 3) by a variable speed motor 86 which is connected to the drive shaft 83a by a chain drive 88. If the processing conveyor 18 is driven at a speed of 60 rows per minute, the feed conveyor will be driven at a somewhat higher speed since the containers of the conveyor are usually not contacting each other. Such speed may be rated at about 80 to 100 containers per minute per lane if the containers are considered to be in abutting contact with each other. It will be understood that the speed of the feed conveyor 66 will be dependent upon how rapidly containers are fed onto the inlet end of the feed conveyor. In this regard, the containers may be introduced into the inlet end of the feed conveyor and may be positioned in alignment with the several lanes by any suitable means. For example, the container-spacing structure disclosed in the aforementioned Mencaccu et al. patent may be used for this purpose.

Although only seven lanes L are shown in FIG. 4, it will be understood that a lesser or greater number, for example, 18 lanes, may be provided. The lanes L are defined by a plurality of vertical guide plates 90 which are adjustably secured to crossbars 92 by collars 94 thereby adapting the feed mechanism 15 to handle containers of different sizes as indicated by the containers C and C' in FIG. 5. It will be noted that the guide plates 90 extend from the inlet end of the feed conveyor 66 to the inlet end of the twisters 75, and that the spacing guide plates 74 cooperate with the plates 90 to provide ample space for the elongated containers to be twisted from a vertical to a horizontal position. It will further be noted that short guide plates 90a are disposed adjacent the outlet end of the twisters and serve to maintain control of the containers as they gravitate into the conveyor 77.

In the event a container is improperly positioned on the feed conveyor, i.e., it is on its side rather than on one end as is desired, the movement of that container and all following containers in its lane will be stopped by a U-shaped leaf spring arrester 95 (FIG. 5), which arrester is secured to one wall of the lane. It will be understood that an arrester 95 is provided for each lane, and that each spring stop arrester 95 flattens against its supporting guide plate 90 to permit properly oriented containers to move therepast, but engages the forward end of containers that are supported on their sides and prevents further movement of these containers until the improperly oriented container is manually reoriented or is removed from the lane.

A dead plate 96 (FIG. 3) is disposed in container supporting position between the feed conveyor 66 and the inlet end of the lower timing conveyor 72. The dead plate 96 also serves as a surface against which the containers are clamped when one of the plurality of arresting mechanism 68 is actuated. Actuation of an arresting mechanism 68 will terminate movement of those containers that are in the associated lane and that are disposed upstream of the arresting mechanism 68. One of the arresting mechanisms 68 is provided for each lane, and each mechanism 68 is operable independently of the other mechanisms.

Each arresting mechanism 68 comprises a power unit, such as a pneumatic cylinder or a solenoid 100, supported by a beam 102 secured to the subframe 84. A shoe 104 is connected to the actuating element of the solenoid 100 and is urged downwardly into clamping engagement with the containers in its lane when actuated by means to be described hereinafter.

The lower timing conveyor 72 comprises a wide endless belt 108 trained around a driven roller 110 and a drive roller 112 that are mounted on shafts 114 and 116, respectively, journaled in the subframe 84. A support plate 118 is secured to the subframe in position to maintain the upper run of the conveyor horizontal. As indicated in FIG. 3, the lower timing conveyor 72 spans the distance between the dead plate 96 and the inlet end of the twister 75 and serves to advance the containers through the spacing section at a predetermined speed.

Since the containers C are moved across the dead plate 96 and onto the lower timing conveyor 72 by the feed conveyor 66 at a higher linear speed than the speed of the conveyor 72, the upper timing conveyors 70 are provided to stabilize the containers during this transfer. The upper conveyors 70 also prevent the possibility of moving the containers on the lower timing conveyor at a speed higher than that of the lower timing conveyor as might occur in the event a solid line of abutting containers were being pushed along one of the lanes onto the lower timing conveyor by the higher speed of the feed conveyor 66.

The upper timing conveyors 70 comprise a plurality of endless belts 122 (FIG. 4), one belt being provided for each lane, with the belts trained around a driven roller 124 and a drive roller 126 keyed on shafts journaled in the subframe 84. A plurality of spring urged guide shoes 134 (FIG. 3) are pivotally mounted on a bar 136 of the subframe 84 above the lower run of associated ones of the belts and each shoe is urged downwardly against the associated belt by a spring to cause firm engagement of the belt against the upper ends of the containers.

The upper and lower timing conveyors are driven so that their container contacting surfaces are moving in the same direction and at the desired feed rate. Thus, the timing conveyors assure that the containers are all moving at the same speed. However, the containers are not aligned in transverse rows at this time but are discharged into the associated twisters 75 at random.

The twisters 75 are best shown in FIGS. 3 and 4 and are of standard well-known design. One twister is provided for each lane L, and each twister includes an upper rectangular bracket 140 shaped so as to allow container supported on one end to pass therethrough, and a lower rectangular bracket 142 shaped to permit containers on their sides to move therethrough. Six guide rails 144 are welded to the upper and lower brackets and are twisted so as to cause the containers to be moved from an upright to a horizontal position as they gravitate through their associated twister 75. A hook-shaped container arrester 146 is provided for each lane at the lower end of the associated twister and is pivotally mounted on a bar 148 secured to the subframe 84.

As mentioned previously, it has been determined that containers, such as metal containers which have a relatively high coefficient of friction, tend to jam if they contact other containers while moving through the twisters 75. Accordingly, one of the aforementioned independent control devices 76 is provided for each lane L. Each control device comprises a bridge 150 (FIG. 3) pivotally mounted on a rod 152 secured to the subframe 84. A spring 153 connected between one end of the gate and an anchor bracket 154 is of sufficient strength to normally maintain the gate inoperative against a stop bar 155 if less than three containers are supported by the bridge 150. However, if three or more containers C'', as indicated in phantom lines in FIG. 3, are supported by the bridge 150, the weight of the three or more containers will overcome the force of the spring and will cause the bridge to pivot thus closing a switch 156 which energizes the associated arresting mechanism 68 through circuitry (not shown) preventing containers upstream of the mechanism from moving past the arresting mechanism until such time as the overload in that particular lane is relieved. Each lane L includes a similar control device 76, and each control device controls the actuation of the associated arresting mechanism 68 in its lane independent of the arresting mechanism or the movement of containers in all of the other lanes.

The containers which gravitate from the twisters 75 are received by the transfer conveying means which includes a guide plate 160, the row-forming conveyor 77 and the turret 78. The containers are received on the guide plate 160 and between the crossbars 77a of the row-forming conveyor 77. The row-forming conveyor includes the crossbar 77a which are secured to spaced parallel endless chains 162 and 164 (FIG. 4). The chains 162 and 164 are trained around pairs of sprockets 166 and 168 keyed on shafts 170 and 172, respectively. The guide plate 160 and an arcuate guide plate 174 are secured to the subframe 84 and cooperate to guide the rows of containers into evenly spaced pockets 176 of the row-accommodating turret 78. The turret 78 is mounted on a shaft 178 which is journaled in the subframe 84, and the containers are retained in the turret pockets 176 by an arcuate plate 180 until transferred into the carriers 43 of the processing conveyor 18.

After the rows of partial rows of containers have been fed into the carriers 43 and have been moved through the cooker, they are discharged from the carriers 43 at the discharge station DS onto a plate 190 and between crossbars 192 of a crossbar discharge conveyor 194. The crossbars 192 are connected to a pair of endless chains 196 (only one chain being shown) which are trained around pairs of sprockets 198 and 200 secured to shafts 202 and 204.

As mentioned previously, the feed conveyor 66 is driven by the variable speed motor 86 at a linear speed which is greater than that of the processing conveyor 18. The turret 78, row-forming conveyor 77 and discharge conveyor 194 are driven at the same speed as the processing conveyor 18. The upper timing conveyor 70 and lower timing conveyor 72 are driven so that their container contacting runs operate at the same speed and move in the direction indicated by the arrows in FIG. 3. These timing conveyors may be driven at the same speed as the processing conveyor 18, or may be driven at a slightly slower speed.

As diagrammatically illustrated in FIG. 3, the row-forming conveyor 77 is driven from the processing conveyor shaft 53 by a chain drive 205 which connects the shaft 53 to the shaft 172 of the row-forming conveyor 77. The shaft 170 of the row-forming conveyor 77 is connected to the shaft 202 of the discharge conveyor 194 by a chain drive 206 and drives the upper run of the discharge conveyor in the direction indicated by the arrow in FIG. 3. A chain drive 208 is connected between the shaft 204 of the discharge conveyor and the shaft 178 of the turret 78 and drives the turret in the direction indicated by the arrow thereon. The lower timing conveyor 72 is driven by chain drive 210 which connects the shaft 170 to the shaft 116, and the upper timing conveyors 70 are driven by a chain drive 212.

In the operation of the first embodiment of the high-speed feed mechanism 15 of the present invention, filled and sealed containers C, such as cans, to be processed are fed onto the feed conveyor 66 (FIGS. 3 and 4) and are divided into lanes by any suitable means such as that disclosed in Mencacci et al. U.S. Pat. No. 3,340,791. If the speed of the processing conveyor 18 is 60 rows per minute, the feed conveyor 66 moves the containers at a rate which will advance containers in each lane, if the containers are abutting one another, at the rate of about 80 to 100 containers per minute. The containers in each lane are pushed at random by the feed conveyor 66 over the dead plate 96 and between the associated timing conveyors 70 and 72. The timing conveyors grip the containers C and are driven at the same speed as, or at a speed slightly slower for example between about one-half to 1½ percent slower, than the speed of the processing conveyor.

In this regard, it will be recognized that if the timing conveyors are driven at a rate, measured in rows per minute, that is slower than the rate in rows per minute of the processing conveyor 18, that full rows are not always formed but that a planned percentage of partial rows will be formed. For example, if the speed of the timing conveyors is 1 percent slower than the speed of the processing conveyor, each lane will supply 99 containers to every 100 carriers moving therepast provided a constant supply of containers is directed into the timing conveyors. Thus, driving the timing conveyor at a slower speed than the speed of the processing conveyor will eliminate the need for the control device 76.

The containers in each lane L are fed at random and one at a time from the timing conveyors 70 and 72 into the upper ends of the associated twisters 75. The twisters 75 cause the containers to pivot from vertical to horizontal positions while gravitating from the upper ends thereof to the lower ends. Upon reaching the lower end of the associated twister 75, each container rides over the bridge 150 of the associated control device 76, and have their forward movement resisted by the aforementioned hooked arresters 146. Normally the containers in each lane L gravitate directly between adjacent crossbars 77a of the crossbar conveyor and combine with the containers in other lanes to form rows or partial rows of containers. However, if an excessive supply of containers are fed into one of the lanes so that three or more containers are supported on the associated bridge 150, that bridge will pivot clockwise (FIG. 3) thereby closing switch 156 which energizes the solenoid 100 in its lane. Energization of solenoid 100 causes the shoe 104 in that lane to move downwardly into clamping engagement with the containers therebelow thereby terminating further movement of containers in that lane past the arresting mechanism 68 until the weight of containers on the bridge 150 is reduced permitting the switch 156 to open and thus deenergize the solenoid 100. It will be understood that the control devices 76 operate independently of each other.

The row-forming conveyor 77 then advances the containers into the pockets 176 of the turret 78 and the turret transfers the rows or partial rows directly into the carriers 43 of the processing conveyor 18.

After the conveyor 18 has moved the rows of containers through the cooking medium in the cooker, during which time the food product therein is first sterilized and thereafter cooled, the rows of processed containers are discharged from the carriers and are received between the crossbars 192 of the discharge conveyor 194 for subsequent discharge from the machine.

As is well known in the art, the carriers 43 of the processing conveyor 18 are designed to handle containers which vary somewhat in size. These carriers are standardized in length to accommodate about 18 containers that are about 4½ inches long. Accordingly, if desired, the feed mechanism may be divided into several groups of lanes with each group of lanes adapted to handle different sizes of containers. For example, a seven lane group may be provided to handle 3-inch diameter times 4½-inch-long cans while another group may be provided to handle longer cans of the same or slightly different diameter. The two groups of containers are simultaneously fed into the carriers 43 by the high-speed feed mechanism of the present invention. It will be understood, of course, that the spacing between guide plates 90 and the size of the twisters 75 must conform to the particular size of the containers being moved through the lanes.

As mentioned previously, the high-speed feed mechanism 15b (FIGS. 6 to 9) of the second embodiment of the invention is especially designed for handling containers such as glass jars J. It is to be understood, however, that the mechanism can also handle other types of containers including cans. Since many of the parts of the mechanism 15b are substantially the same as the parts of the mechanism 15, only those parts of the mechanism 15b which are different than those of the mechanism 15 will be described in detail. Parts of the high-speed mechanism 15b which are equivalent to parts of the mechanism 15 will be assigned the same numerals followed by the letter "b."

The high-speed feed mechanism 15b comprises a feed conveyor 66b, a deadplate 96b, a series of upper spacing conveyors 70b, a lower spacing conveyor 72b, and guide plates 90b and 74b which divide all of the above mentioned conveyors into a series of lanes Lb (only one lane being shown in FIG. 6). A twister 75b is provided for each lane Lb, and the lower end of each twister communicates directly with a row-forming turret 220. Rows or partial rows of containers are formed in the turret 220 and each row is deflected by the turret, into the carriers 43b of the processing conveyor 18b. The turret 220 is mounted on a shaft 222 which is driven at a speed measured in rows per minute which is equal to that of the processing conveyor 18b.

As mentioned previously, when handling glass jars J it is desirable to maintain the jars within the twisters 75b in abutting contact and under a slight pressure thereby minimizing glass breakage. It is also desirable to permit the jars in each lane to move independently of the jars in the other lanes. Accordingly, the turret 220 is divided into independent sections 224 which are equal in number to the number of lanes Lb.

Each turret section 224 (FIGS. 8 and 9) comprises a sleeve 226 journaled on the shaft 222 and having a reduced diameter splined end portion 228. A pair of star wheels 230 are secured to each sleeve 226 and have a plurality of equally spaced container-engaging pockets 232 therein. A drive disc 234 is associated with each sleeve 226, keyed to the shaft 222, and has a plurality of equally spaced slots 236 formed in its periphery, one slot 236 being provided for each pocket 232. A splined, shiftable clutch member 238 is slidably received on the splined portion 228 of the sleeve 226 and has a plurality of teeth 240 projecting therefrom and engageable with the slot 236 when aligned therewith.

As shown in FIG. 8, each clutch member 238 has an annular groove 239 in its periphery and receives rollers 242 (FIG. 9) journaled on the lower ends of a yoke 244. The yoke 244 is formed integrally with a bellcrank 246 which is pivotally connected to a crossmember 248 of the subframe 84b by a shouldered bolt 250. A plurality of solenoids 252 are mounted on the crossmember 248, and the actuating elements 254 of each solenoid is connected to an associated one of the bellcranks 246 by a pin 256 which extends through a slot (not shown) in the bellcrank 246. As indicated in FIG. 8, a brake shoe 258 is formed on each bellcrank and is positioned to engage one of the star wheels 230 when the associated solenoid 252 is deenergized thereby locking the particular turret section 224 stationary. Upon energization of one of the solenoids 252, the associated bellcrank moves the clutch member 238 into engagement with the associated drive disc 234 allowing the teeth 240 to engage the slots 236 and cause that turret section to rotate with the shaft 222 with other turret sections to transfer rows of containers into the carriers 43b.

A normally closed switch 260 (only one being shown in FIG. 6) is provided for each lane Lb and is connected (by circuitry not shown) to the solenoid 252 associated with that lane. Each switch is maintained closed when a pivoted actuating arm 262 rides along the upper surfaces of the containers or jars J in that lane. Thus, when the switch is in this position the associated solenoid 250 is energized and the associated turret section is driven by the shaft 222. However, if containers are not present under the switch arm 262 the weight of the arm will open the associated switch 260 thereby deenergizing the associated solenoid 252 causing the associated turret section 224 to be held from further rotation until containers again move under the arm and raise the arm thereby allowing the associated switch to return to its normally closed position.

As illustrated in FIG. 6, the feed conveyor 66b is driven by variable speed motor 86b at the rate of about 80 to 100 rows per minute assuming that the containers are abutting each other. A chain drive 266 connects the feed conveyor 66b to the motor 86b. The turret shaft 222 and discharge conveyor 194b are driven in the direction indicated by the arrows in FIG. 6 at the same rate, measured in rows per minute, as the conveyor 18b by chain drives 268 and 270, respectively. The lower timing conveyor 72b is driven from the shaft 202b of the discharge conveyor 194b at the same speed as the speed of the processing conveyor, measured in rows per minute, by a chain drive 272; and the upper timing conveyors 70b are driven at the same speed as the lower timing conveyor 72b by a chain drive 274.

In operation of the second embodiment of the high-speed feed mechanism 15b of the present invention, when the processing conveyor 18b is driven at the rate of 60 rows per minute; the turret shaft 222, the upper timing conveyors 70b, and the lower timing conveyor 72b are all driven at 60 rows per minute. Since the containers are normally spaced somewhat on the feed conveyor 66b, the feed conveyor is driven by the variable speed motor 86b between the rates of about 80 to 100 containers per minute per lane, said rate being based on the assumption that containers are in abutting contact.

With the several conveyors and the turret driven at the speeds indicated above and in the direction indicated by the arrows in FIG. 6, the portion of each lane Lb downstream of the timing conveyors is normally supplied with an abutting series of containers that are moving at the rate of about 60 rows per minute and which are maintained under a slight pressure by virtue of a pushing effect exerted by the timing conveyors 70b and 72b and the resisting effect provided by the pockets 232 of the turret 220. During this time, all of the solenoids 252 will be energized thus causing all of the turret sections 224 to rotate as a unit. In the event a shortage of containers occurs in one lane, the associated arm 262 will pivot clockwise (FIG. 6) thereby opening switch 260 and deenergizing the associated solenoid 252. Deenergization of solenoid 252 causes the clutch member 238 of that turret section to disengage from the associated drive disc 234 and causes the brake shoe 256 to lock the associated turret section in fixed position until a complete supply of containers is present in that lane downstream of the timing conveyor. The presence of these containers causes the switch 260 to close thereby energizing the associated solenoid 252 and again engaging the turret section 224 to the shaft 222 resuming normal feeding operation of the containers in that lane. It will, of course, be understood that the control mechanism for each lane, which mechanism includes the associated turret section 244, the associated solenoid 252, and the associated switch 260, will operate independently of the control mechanisms associated with the other lanes.

It will be apparent from the above description that both embodiments of the present invention disclose row-forming feed mechanisms which operate at high speeds. The feed mechanisms are provided with independent lane controlling mechanisms which assure that each carrier is loaded with a partial or complete row of containers. In the event of an oversupply of containers occurs in a lane of the first embodiment of the invention; or an under supply occurs in a lane of the second embodiment of the invention, the movement of the containers in only that defective lane is controlled so as to correct the objectionable condition while the containers in all the other lanes are undisturbed and are fed into the carriers of the processing conveyor in the usual manner. Thus, each carrier, provided a continuous supply of containers are available to the feed conveyor, will receive either a complete row of containers or a substantially complete row of containers.

Although the best mode contemplated for carrying out the present invention has been herein shown and described, it will be apparent that modification and variation may be made without departing from what is regarded to be the subject matter of the invention.

What I claim is:

1. A high-speed feed mechanism for forming containers into rows and for feeding the rows of containers into elongated carriers of a continuously driven processing conveyor moving at a predetermined speed, comprising feed conveying means for receiving a supply of randomly spaced cylindrical containers standing on end and for moving the containers in a predetermined direction and at a speed different from said predetermined speed, means for separating the containers into a plurality of lanes, timing means for changing the speed of the containers and for continuously moving the containers at a timed speed approximately equal to said predetermined carrier speed; twisting means for receiving the containers from said timing means while moving at said timed speed and for turning the containers to lie on their sides, row forming means for receiving containers from said twisting means and forming the containers into rows extending transversely of said predetermined direction and for moving the rows of containers at said predetermined speed into the carriers, drive means for continuously moving at least a portion of said row-forming means at said predetermined speed, and independent control means associated with each lane and operable to terminate movement of containers in a portion of any of said lanes in the event the supply of containers of any of said lanes is not as desired while allowing unobstructed movement of the containers in the other lanes.

2. A high-speed feed mechanism for forming containers into rows and for feeding the rows of containers into elongated carriers of a continuously driven processing conveyor moving at a predetermined speed, comprising feed-conveying means for receiving a supply of randomly spaced cylindrical containers standing on end and for moving the containers in a predetermined direction and at a speed different from said predetermined speed, means for separating the containers into a plurality of lanes, timing means for changing the speed of the containers and for continuously moving the containers at a timed speed approximately equal to said predetermined carrier speed; twisting means for receiving the containers from said timing means while moving at said timed speed and for turning the containers to lie on their sides, row-forming means for receiving containers from said twisting means and forming the containers into rows extending transversely of said predetermined direction and for moving the rows of containers at said predetermined speed into the carriers, drive means for continuously moving at least a portion of said row-forming means at said predetermined speed, said row-forming means including continuously moving spaced abutments, said abutments being divided into independent sections with each section being associated with one lane, and control means provided to terminate movement of those abutment sections associated with lanes having less than the desired quantity of containers therein.

3. A high-speed feed mechanism for forming containers into at least partial rows and for feeding the rows of containers into elongated carriers of a continuously driven processing conveyor moving at a predetermined speed, comprising feed-conveying means for receiving a supply of spaced containers sufficient to form said rows and for moving the containers in a predetermined direction and at a speed different from said predetermined speed, means for separating the containers into a plurality of lanes, timing means for changing the speed of the containers and for continuously moving the containers at a timed speed equal to said predetermined carrier speed, guide means for randomly receiving the containers from said timing means while moving at said timed speed, a continuously driven row-forming turret for continuously receiving containers from said transfer means and forming the containers into at least partial rows extending transversely of said predetermined direction and for moving at least partial rows of the containers at said predetermined speed into each and every one of the carriers, and independent control means provided for each lane, said control means being effective to terminate movement of the containers in a portion of any lane in which the supply of containers is not as desired while permitting unobstructed movement of containers in the other lanes.

4. A high-speed feed mechanism for forming containers into rows and for feeding the rows of containers into elongated carriers of a continuously driven processing conveyor moving at a predetermined speed, comprising feed conveying means for receiving a supply of spaced containers and for moving the containers in a predetermined direction and at a speed different from said predetermined speed, means for separating the containers into a plurality of lanes, timing means for changing the speed of the containers and for continuously moving the containers at a timed speed equal to said predetermined carrier speed, twisting means for receiving the containers from said timing means while moving at said timing speed and for turning the containers between a position wherein their axes are vertical to a position wherein their axes are horizontal, a row-forming turret for receiving containers from said twisting means and forming the containers into rows extending transversely of said predetermined direction and for moving the containers at said predetermined speed into the carriers, said turret being divided into spaced independent sections with each section being associated with one lane, and control means provided to terminate movement of those abutment sections associated with lanes having less than a desired quantity of containers therein.

5. A high-speed feed mechanism for forming containers into rows and for feeding the rows of containers into elongated carriers of a continuously driven processing conveyor moving at a predetermined speed, comprising feed conveying means for receiving a supply of randomly spaced cylindrical containers standing on end and for moving the containers in a predetermined direction and at a speed different from said predetermined speed, means for separating the containers into a plurality of lanes, timing means for changing the speed of the containers and for continuously moving the containers at a timed speed approximately equal to said predetermined carrier speed; twisting means for receiving the containers from said timing means while moving at said timed speed and for turning the containers to lie on their sides, row-forming means for receiving containers from said twisting means and forming the containers into rows extending transversely of said predetermined direction and for moving the rows of containers at said predetermined speed into the carriers, drive means for continuously moving at least a portion of said row-forming means at said predetermined speed, said timing means moving said containers at said predetermined speed, and control means provided to terminate movement of the containers upstream of said twisting means in any lane in which two or more containers are simultaneously being twisted.

6. A high-speed feed mechanism for forming containers into rows and for feeding the rows of containers into elongated carriers of a continuously driven processing conveyor moving in a predetermined speed, comprising feed conveying means for receiving a supply of randomly spaced containers and for moving the containers in a predetermined direction and at a speed different from said predetermined speed, means for separating the containers into a plurality of lanes, timing means for changing the speed of the containers and for continuously moving the containers at a timed speed within the range of said predetermined speed to about 2 percent slower than said predetermined speed, twisting means for randomly receiving the containers from said timing means while moving at said timing speed and for turning the containers between a position wherein their axes are vertical and a position wherein their axes are horizontal, continuously driven row-forming means including means defining a series of transversely extending continuously moving spaced abutments for receiving the containers from said twisting means and for moving the rows of containers at said predetermined speed into said carriers, and independent control means provided for each lane, said control means being effective to terminate movement of the containers in a portion of any lane in which the supply of containers is not as desired while permitting unobstructed movement of containers in the other lanes.

7. A high-speed feed mechanism for forming containers into rows and for loading the rows of containers into carriers of a driven endless processing conveyor, comprising a driven feed conveyor for receiving a supply of containers supported on their ends in sufficient quantity to fill all carriers of the processing conveyor; means defining timing conveyors disposed downstream of said feed conveyor; means for dividing said feed conveyor, and said timing conveyors into lanes equal in number to the maximum number of containers to be accumulated in a row; twisting means disposed downstream of each of said lanes for receiving containers therefrom and for twisting the containers from positions supported on their ends to positions supported on their sides; row-forming means for receiving the containers from said twisting means and for arranging said containers in rows; said row-forming means being arranged to move the rows of containers into the carriers of the processing conveyor; means for driving at least a portion of said row-forming means at the same rate in rows per minute as said processing conveyor and for driving said timing conveyors at a rate in rows per minute substantially equal to the rate of said processing conveyor; and independently controlled arresting means associated with each lane for momentarily terminating movement of the containers in a portion of any lane in the event the supply of containers in that lane is not as desired.

8. An apparatus according to claim 7 wherein said timing conveyors are driven at the same speed in rows per minute as said processing conveyor.

9. An apparatus according to claim 7 wherein said timing conveyors are driven between about one-half to 2 percent slower than said processing conveyor so as to provide a planned number of rows having less than a full complement of containers therein.

10. An apparatus according to claim 7 wherein said row-forming means includes a turret having a plurality of equally spaced pockets on its periphery.

11. An apparatus according to claim 7 wherein each independently controlled arresting means is associated with a single lane and includes an arresting mechanism disposed upstream of the associated twisting means and movable between an inactive position spaced from the containers to an arresting position engaging the containers for precluding containers upstream thereof from moving therepast, and further includes control means disposed downstream of said twisting means and responsive to the accumulation of three or more containers in the downstream end of said twisting means, means for effecting movement of said arresting mechanism into said arresting position and for retaining said arresting mechanism in said arresting position until less than three containers are present in the downstream end of said associated twisting means.

12. An apparatus according to claim 11 wherein the containers are hermetically sealed cans.

13. An apparatus according to claim 7 wherein said controlled arresting means is provided for allowing only one container at a time to be moved through each twisting means.

14. An apparatus according to claim 7 wherein said row-forming means includes a pocketed turret communicating directly with each of said twisting means and with the carriers of the processing conveyor.

15. An apparatus according to claim 14 wherein said timing conveyors cooperate with the pocketed turret to maintain a plurality of containers within the twisting means in abutting contact and under slight pressure.

16. An apparatus according to claim 15 wherein said turret is divided into a plurality of turret sections with each turret section associated with a different one of said lanes, and wherein said arresting means includes means responsive to the absence of an abutting series of containers in a lane between said associated turret section and said timing conveyors for locking only the associated section stationary until an abutting series of containers is again formed between said turret section and timing conveyors.

17. An apparatus according to claim 16 wherein the containers being processed are hermetically sealed glass jars.

18. An apparatus according to claim 7 wherein said independently controlled arresting means includes control means effective to maintain the containers spaced as they move through the twisters.

19. An apparatus according to claim 7 wherein said processing conveyor and row-forming means are continuously driven at the rate of about 60 containers per minute and wherein said timing conveyors are continuously driven between the rates of about 60 to 59½ rows per minute.

20. A high-speed feed mechanism for forming containers into rows and for feeding the rows of containers into elongated carriers of a continuously driven processing conveyor moving at a predetermined speed, comprising feed conveying means for receiving a supply of randomly spaced cylindrical containers standing on end and for moving the containers in a predetermined direction and at a speed different from said predetermined speed, means for separating the containers into a plurality of lanes, timing means for changing the speed of the containers and for continuously moving the containers at a timed speed approximately equal to said predetermined carrier speed; twisting means for receiving the containers from said timing means while moving at said timed speed and for turning the containers to lie on their sides, row-forming means for receiving containers from said twisting means and forming the containers into rows extending transversely of said predetermined direction and for moving the rows of containers at said predetermined speed into the carriers, drive means for continuously moving at least a portion of said row-forming means at said predetermined speed, said row-forming means includes a row accommodating endless conveyor and a turret, and independent control means associated with each lane and operable to terminate movement of containers in a portion of any of said lanes in the event the supply of containers in any of said lanes is not as desired while allowing unobstructed movement of the containers in the other lanes, each of said independently controlled arresting means being associated with a single lane and includes an arresting mechanism disposed upstream of the associated twisting means and movable between an inactive position spaced from the containers to an arresting position engaging containers for precluding containers upstream thereof from movement therepast, and further includes control means disposed downstream of said associated twisting means and responsive to the accumulation of three or more containers in the downstream end of said twisting means, means for effecting movement of said arresting mechanism into said arresting position and for retaining said arresting mechanism in said arresting position until less than three containers are present in the downstream end of said associated twisting means.

21. A high-speed method for forming and feeding at least partial rows of containers into elongated carriers of a processing conveyor that is moving at a predetermined speed, comprising the steps of receiving a supply of randomly spaced containers and continuously moving the containers in a predetermined direction and at a speed different from said predetermined speed, separating the continuously moving containers into a plurality of lanes, changing the speed of the containers and continuously moving the containers at a timed speed approximately equal to said predetermined speed, receiving the continuously moving containers while moving at said timed speed, thereafter forming the continuously moving containers into at least partial rows extending transversely of said predetermined direction, continuously moving the rows of containers at said predetermined speed and into each and every one of the carriers, and terminating movement of containers in a portion of any one of the lanes in the event that the supply of containers in that lane is not as desired while the containers in the other lanes are unaffected in their movement.

22. A high-speed method for forming and feeding rows of containers into elongated carriers of a processing conveyor that is moving at a predetermined speed, comprising the steps of receiving a supply of randomly spaced containers and moving the containers in a predetermined direction and at a speed different from said predetermined speed, separating the containers between a plurality of lanes, changing the speed of the containers and continuously moving the containers at a timed speed approximately equal to said predetermined speed, receiving the continuously moving containers while moving at said timing speed and shifting the containers between a position wherein their axes are vertical and a position wherein their axes are horizontal, thereafter forming the containers into rows extending transversely of said predetermined direction, moving the rows of containers at said predetermined speed and into the carriers, and terminating movement of containers in a portion of any one of the lanes in the event that the supply of containers in that lane is not as desired while the containers in the other lanes are unaffected in their movement.

23. A high-speed method for forming and feeding rows of containers into elongated carriers of a processing conveyor that is moving at a predetermined speed, comprising the steps of receiving a supply of randomly spaced containers and moving the containers in a predetermined direction and at a speed different from said predetermined speed, separating the containers into a plurality of lanes, changing the speed of the containers and continuously moving the containers at a timed speed approximately equal to said predetermined speed, receiving the continuously moving containers while moving at said timing speed and shifting the containers between a position wherein their axes are vertical and a position wherein their axes are horizontal, thereafter forming the containers into rows extending transversely of said predetermined direction, moving the rows of containers at said predetermined speed and into the carriers, and independently terminating the movement of a container that has already been formed into a row and is also in a lane in which a complete abutting series of containers is lacking during the twisting step while allowing the remaining portion of the formed row of containers to be moved into a carrier.